Sept. 25, 1962 E. R. BEEBE ET AL 3,055,996
METALCLAD SWITCHGEAR

Filed Oct. 12, 1959

INVENTORS
Emmett R. Beebe,
BY Jan Blokland,
Robert R. Lockwood
att'y

Sept. 25, 1962 E. R. BEEBE ET AL 3,055,996
METALCLAD SWITCHGEAR
Filed Oct. 12, 1959 6 Sheets-Sheet 2

INVENTORS
Emmett R. Beebe,
Jan Blokland,
BY Robert R. Lockwood
atty.

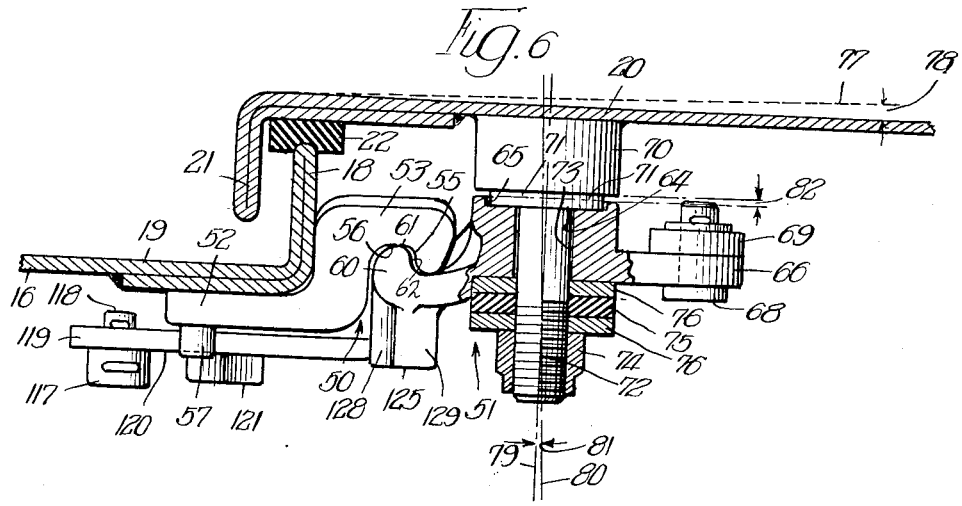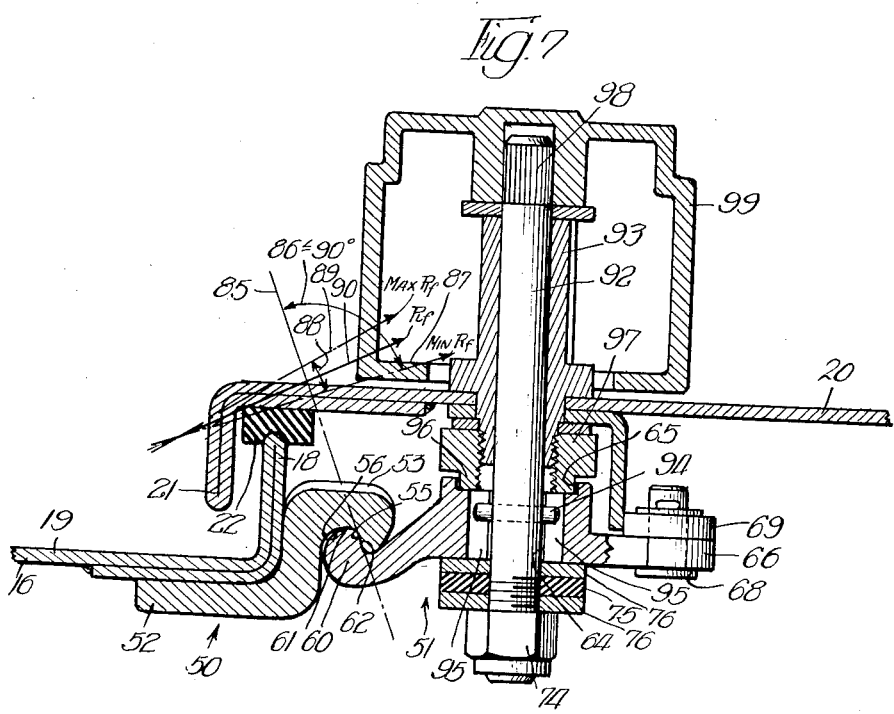

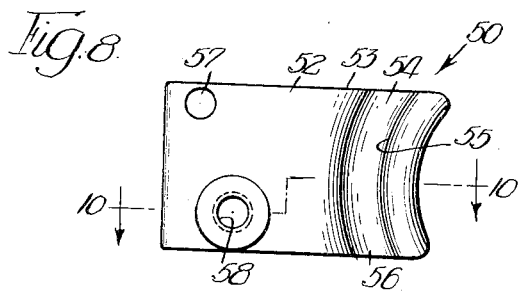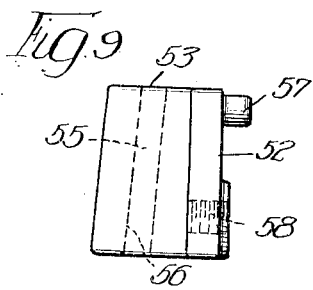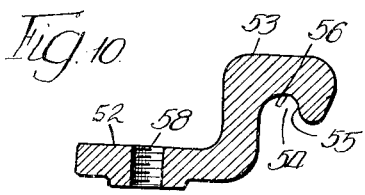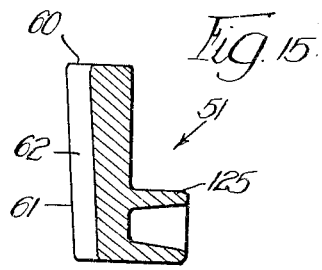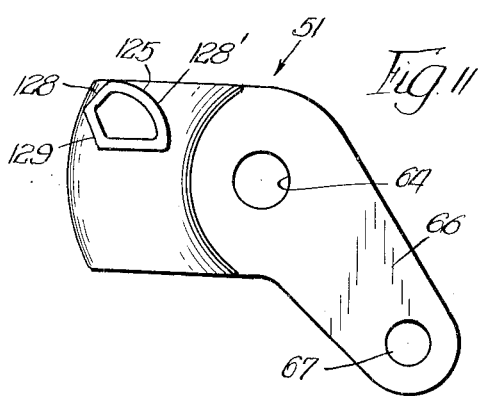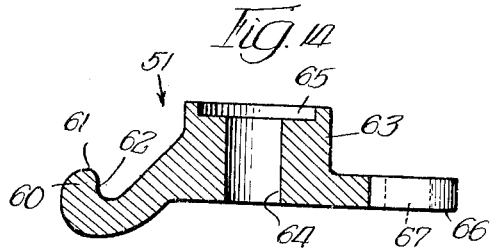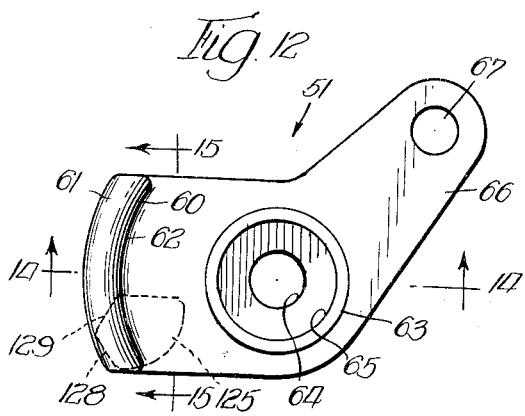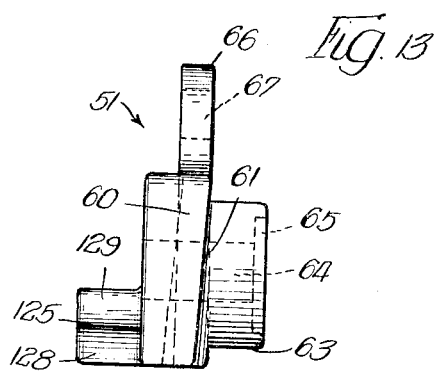

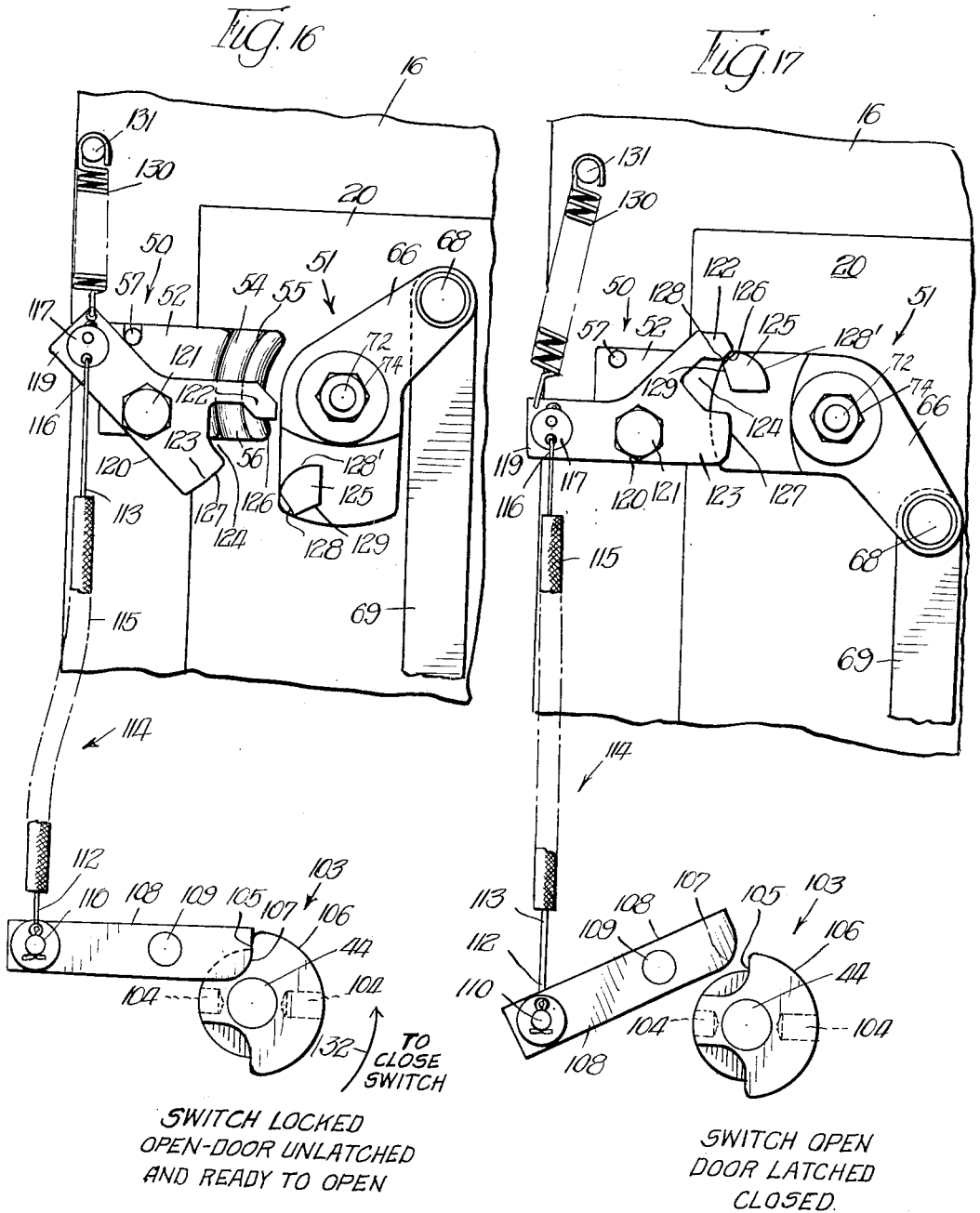

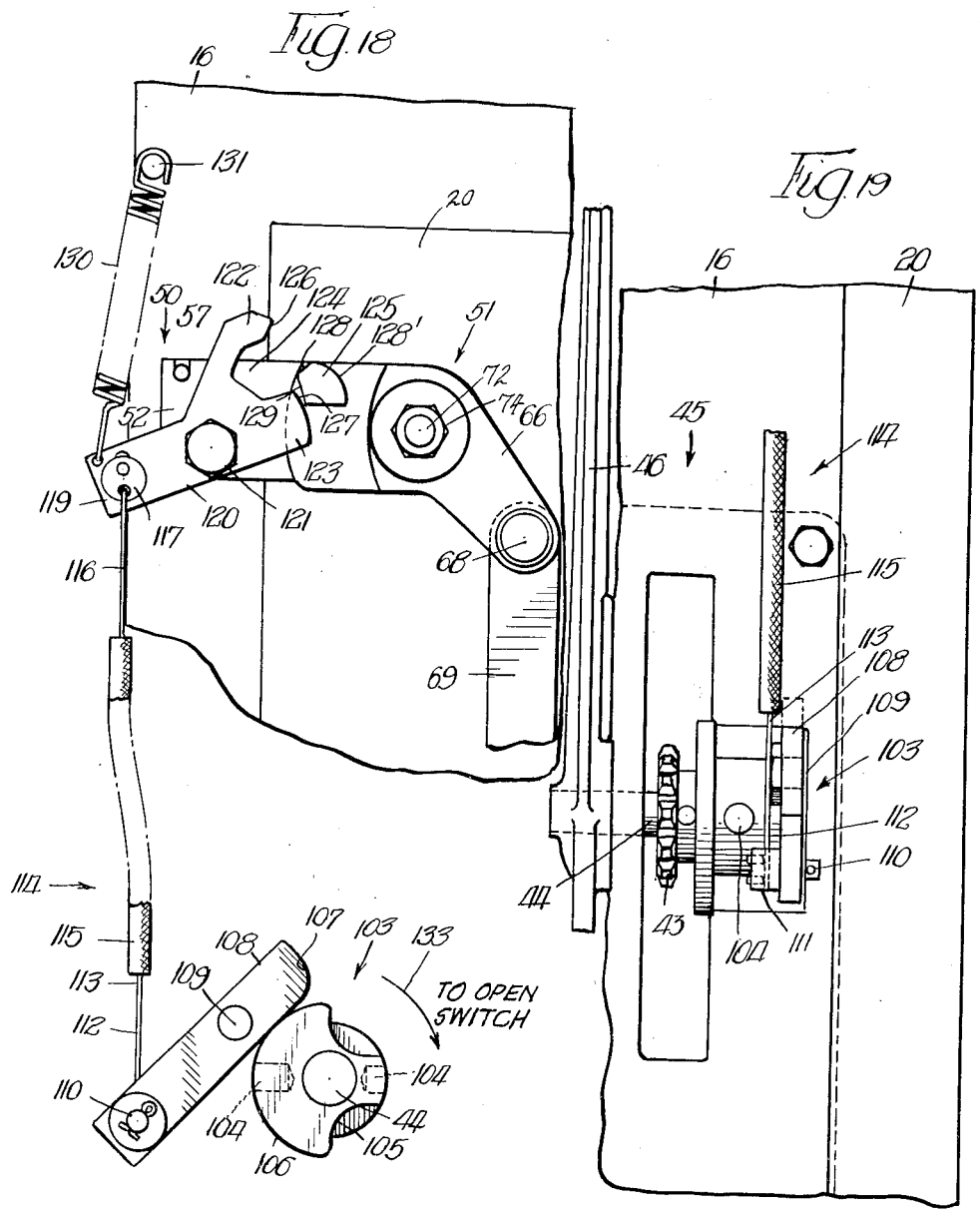

United States Patent Office 3,055,996
Patented Sept. 25, 1962

3,055,996
METALCLAD SWITCHGEAR
Emmett R. Beebe, Chicago, and Jan Blokland, Des Plaines, Ill., assignors to S & C Electric Company, Chicago, Ill., a corporation of Delaware
Filed Oct. 12, 1959, Ser. No. 845,806
12 Claims. (Cl. 200—50)

This invention relates, generally, to high voltage metalclad switchgear and it has particular relation to the construction of the enclosure or housing therefor with respect to the means for interlocking of the door of the enclosure with the operation of the switch and to the means for latching of the door in closed position.

As a safety measure it is desirable that provision be made for preventing the opening of the door of the enclosure when the disconnecting switch is closed. Also the closure of the switch should be prevented when the door is unlatched.

It is customary to provide a fuse of the vented type in series with the disconnecting switch in such an enclosure for the purpose of interrupting the flow of overload and a short circuit current. When such a vented fuse operates under these conditions, it does so with a blast action that results in a violent expansion of gases and the propagation of a shock wave in the housing which places the walls and door under substantial momentary stress. This stress tends to cause the walls and door to bulge outwardly to an extent depending upon the severity of the blast action. A corresponding shock loading is applied to the door hinges and latches.

Accordingly, among the objects of this invention are: To provide an improved construction for steel walled enclosures used for housing high voltage switching apparatus, such as disconnecting switches and vented fuses, particularly with respect to the arrangement of the latch mechanism employed for holding the door of the enclosure in the closed position under all normal and abnormal operating conditions likely to be met in the customary use of this equipment; to prevent opening of the door when the switch is closed and closure of the switch when the door is opened; to interlock the switch operating mechanism and the door latch mechanism in such a manner as to provide for these operating safeguards; to construct the door latch mechanism so that it can withstand the forces incident to blast action applied against the inner surfaces of the walls and door forming the enclosure as the result of energy released in the form of a shock wave when one or more of the vented fuses blow under overload or short circuit fault conditions; to so shape the interengaging surfaces of the stationary and movable parts of the latch mechanism that they remain in engagement when they are subjected to the forces incident to such blast action and relative movement, otherwise tending to unlatch them, takes place; to permit this relative movement while maintaining the parts in locking engagement; to mount the movable part or parts of the latch mechanism on the door in such manner that relative movement therebetween can take place without deformation or disengagement of any of the latch parts; to provide the latch parts with mutually engaging overlapping faces in a plane parallel to the plane of the door to hold the door closed under stress and with other engaging overlapping surfaces preventing endwise separation of the latch parts when the housing and door are subjected to the aforesaid blast action; and to permit lateral displacement of each movable latch part on the door along its axis of rotation thereon and angular displacement from this axis when the blast action occurs and the walls and door bulge outwardly.

Other objects of this invention will, in part, be obvious and in part appear hereinafter.

This invention is disclosed in the embodiment thereof shown in the accompanying drawings and it comprises the features of construction, combination of elements and arrangement of parts that will be exemplified in the construction hereinafter set forth and the scope of the application of which will be indicated in the appended claims.

For a more complete understanding of the nature and scope of this invention, reference can be had to the following detailed description, taken together with the accompanying drawings, in which:

FIGURE 3 is a horizontal sectional view, at an enlarged scale, taken generally along the line 3—3 of FIGURE 1;

FIGURE 4 is a vertical sectional view taken generally along the line 4—4 of FIGURE 3;

FIGURE 6 is a horizontal sectional view taken generally along the line 6—6 of FIGURE 5 and showing, at an enlarged scale, the details of construction of the latch at the upper end of the swinging edge of the door, and showing by broken lines the relative positions of the parts when the enclosure bulges outwardly as a result of shock incident to blast action;

Figure 5:
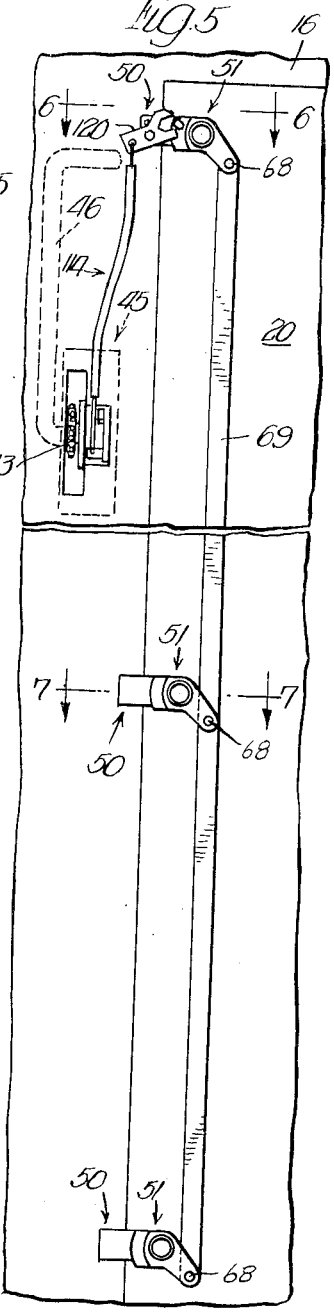
FIGURE 5 is a view in vertical elevation of a portion of the enclosure shown in FIGURE 1, the view being taken inside the enclosure and looking outwardly.

FIGURE 7 is a horizontal sectional view taken generally along the line 7—7 of FIGURE 5 and showing, at an enlarged scale, the latch construction located at the center of the swinging edge of the door, and indicating the extent that the movable latch member can rock with respect to the fixed latch member without unlatching when the enclosure is subjected to the blast action resulting from operation of the fuse;

FIGURE 8 is a view, in vertical elevation, of the fixed latch member which forms a part of the latch mechanism;

FIGURE 9 is an end view of the fixed latch member shown in FIGURE 8, the view being taken looking from left to right;

FIGURE 10 is a horizontal sectional view taken generally along the line 10—10 of FIGURE 8;

FIGURE 11 is a vertical elevational view of the movable latch member which is rotatably mounted on the door and cooperates with the fixed latch member shown in FIGURES 8, 9 and 10;

FIGURE 12 is a vertical elevation view of the opposite side of the fixed latch member from that shown in FIGURE 11;

FIGURE 13 is a view in end elevation of the movable latch member shown in FIGURE 12, the view being taken looking from left to right;

FIGURE 14 is a horizontal sectional view taken generally along the line 14—14 of FIGURE 12;

FIGURE 15 is a vertical sectional view taken generally along the line 15—15 of FIGURE 12;

FIGURE 16 is a view in vertical plan showing the latch mechanism unlatched and also showing in vertical plan the interlock to the switch operator, it being understood that the latter has been turned through 90° into the plane in which the latch mechanism is shown;

FIGURE 17 is a view, similar to FIGURE 16, but showing the door latched with the switch operating mechanism in the open position;

FIGURE 18 is a view, similar to FIGURES 16 and 17, but showing the switch operating mechanism in the switch closed position and the door latched closed; and FIGURE 19 is a vertical elevational view looking outwardly from the interior of the enclosure and showing certain of the details of construction of the operator for moving the disconnecting switch between the open and closed positions.

Figure 1:
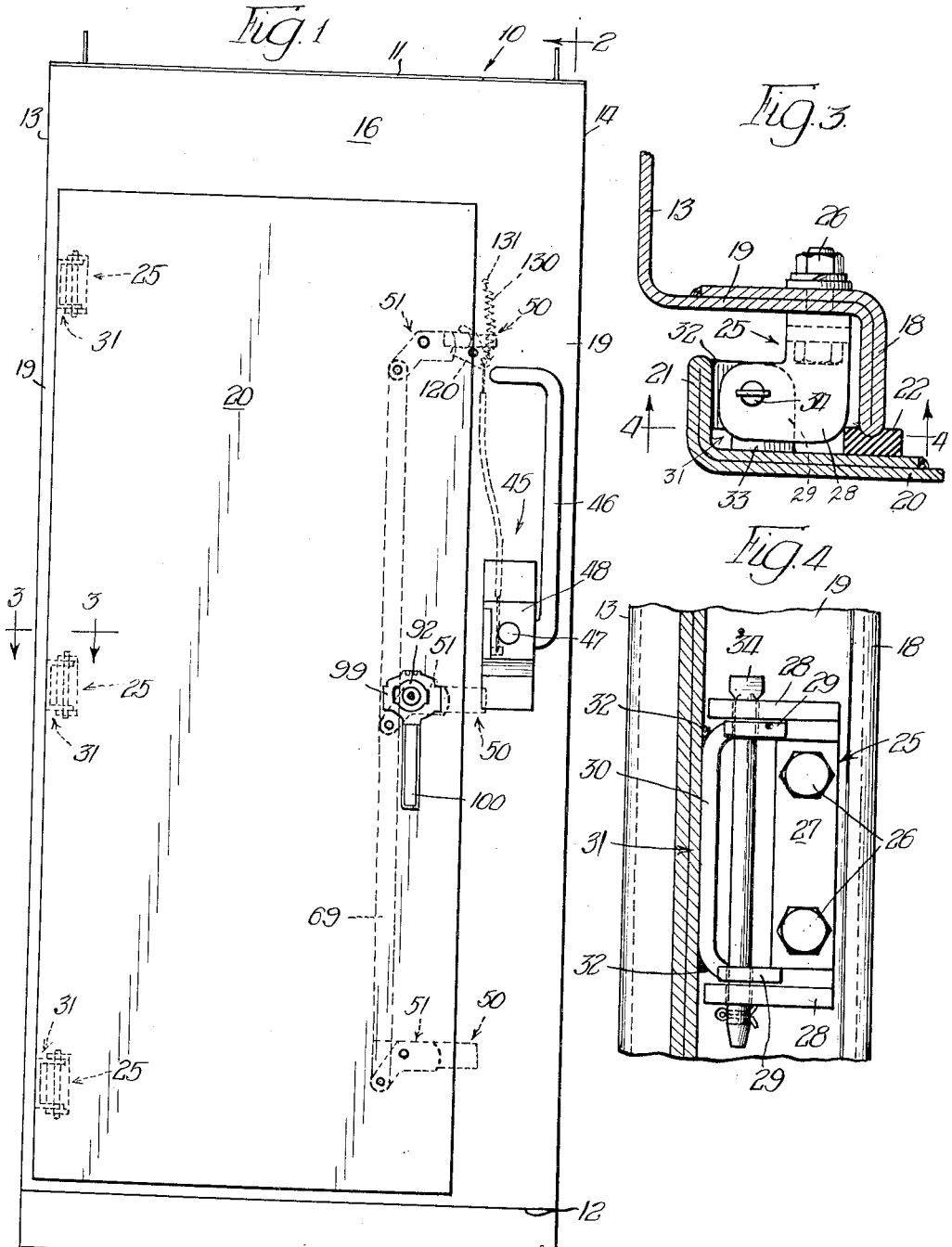
FIGURE 1 is a view, in front elevation, of a metalclad switchgear enclosure constructed in accordance with this invention.
Figure 2:
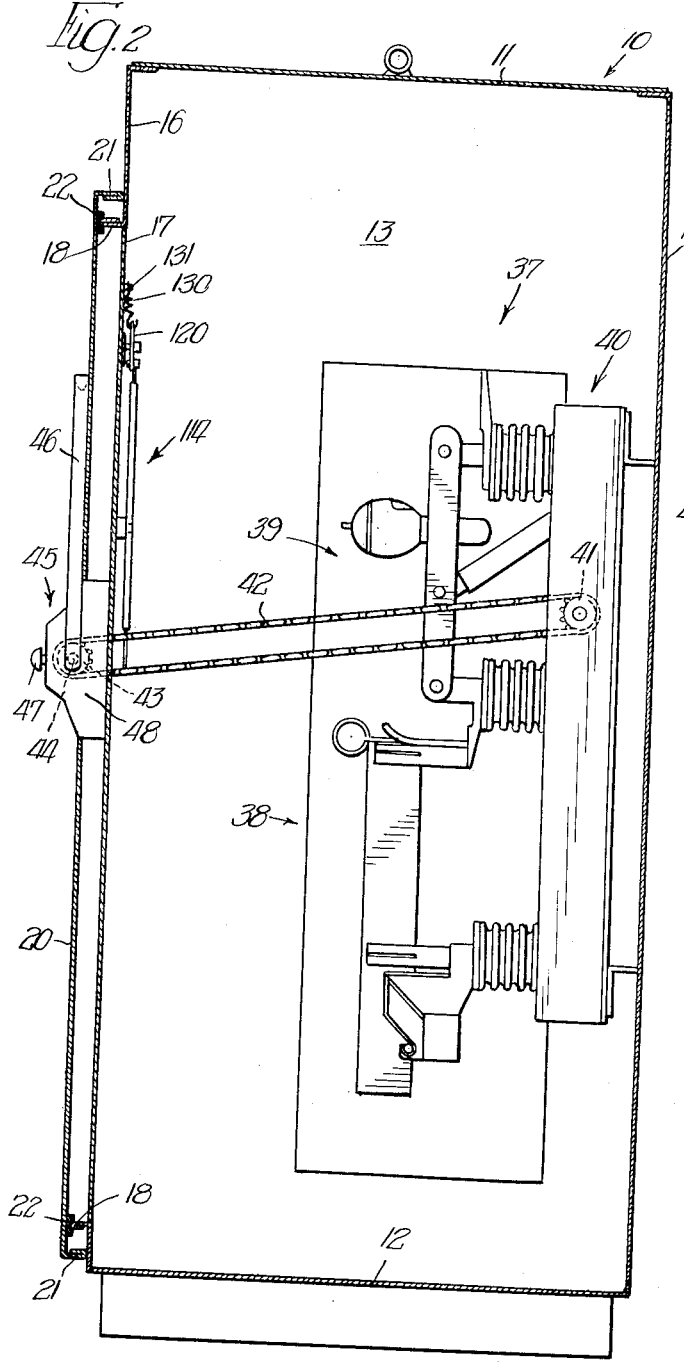
FIGURE 2 is a vertical sectional view taken generally along the line 2—2 of FIGURE 1 and showing the high voltage electric circuit interrupting means mounted within the enclosure.

Referring now particularly to FIGURES 1 and 2 of the drawings, it will be observed that the reference character 10 designates, generally, an enclosure or housing for metalclad switchgear which is generally rectangular in shape. The enclosure 10 includes top and bottom walls 11 and 12 and vertically extending side walls 13 and 14. Also, there are provided back and front walls 15 and 16. It will be understood that the walls 11 to 16 are suitably joined together at their meeting edges and that they are formed of metal, such as sheet steel.

The front wall 16 is provided with a door opening 17. For reinforcing the front wall 16 it is formed with a double thickness 18 along the periphery of the door opening 17, as shown more clearly in FIGURES 3 and 4 of the drawings. This double thickness 18 around the periphery of the door opening 17 is located along a stile 19 having a door 20 in overlapping relation therewith. The door 20 is formed of the same material as the walls 11 to 16 and has its periphery of double thickness, as indicated at 21, turned over to lie in parallel spaced relation outwardly of the double thickness portion 18 along the stile 19. A compressible gasket 22 of rubber or rubber-like material is interposed between the outer edge of the double thickness portion 18 defining the door opening 17 and the inner surface of the door 20 to provide a water tight seal when the door 20 is closed. It will be understood that any suitable gasket construction can be used which can be compressed on closure of the door 20.

As pointed out above, the enclosure 10 is likely to be subjected to the blast action which results from the blowing of a vented fuse. Accordingly, it is necessary that the door 20 be mounted in a substantial fashion on the enclosure 10 for the purpose of maintaining the door 17 closed under all operating conditions likely to be encountered. To this end the door 20 is mounted along the stile 19 by three hinges, as shown in FIGURE 1, with the details being shown in FIGURES 3 and 4. It will be observed here that each hinge includes a stationary hinge leaf shown generally at 25 that is secured by bolts 26 to the stile 19. The stationary hinge leaf 25 includes a flat central portion 27, through which the bolts 26 project, and arms 28 at the ends of the flat central portion 27 which overlie arms 29 that are located at the ends of a flat central portion 30 which forms a part of a rotating hinge leaf 31. The rotating hinge leaf 31 is secured to the door 20 by welding as indicated at 32 and 33. As shown in FIGURE 3 the rotating hinge leaf 31 is located in the angle between the inturned double thickness portion 21 of the door 20 and the adjacent inner face. A hinge pin 34 extends through the arms 28 and 29 and serves to pivotally mount the door 20 on the enclosure 10 for each of three hinge constructions.

The purpose of providing the metal enclosure 10 is to house high voltage electric circuit interrupting means indicated generally at 37. For illustrative purposes it is pointed out that the high voltage electric circuit interrupting means 37 may be constructed as shown in Mikos and Chabala application Serial No. 791,414, filed February 5, 1959, now Patent No. 2,989,603, issued June 20, 1961. However, it will be understood that other electric circuit means can be mounted within the enclosure 10 constructed as disclosed herein.

Ordinarily the high voltage electric circuit interrupting means 37 is arranged for three phase operation and includes three vented fuses, shown generally at 38, which are individually connected in series circuit relation with three disconnecting switches, shown generally at 39. The vented fuses 38 can be constructed as disclosed in Lindell application Serial No. 787,481, filed January 19, 1959, now Patent No. 2,961,514, issued November 22, 1960 and are arranged to vent directly to the interior of the enclosure 10 or through a condenser as may be desired. The high voltage electric circuit interrupting means 37 is insulatingly mounted on a base, shown generally at 40, that is carried by the back wall 15 of the enclosure 10.

With a view to effecting operation of the disconnecting switches 39, as described in the Mikos and Chabala application above referred to, a sprocket 41 is provided and is suitably connected to the switch operating mechanism. For present purposes it is pointed out that provision is made for rotating the sprocket 41 to effect movement of the blade forming a part of the disconnecting switch 39 or the three blades where a three phase installation is employed, between the closed and the open positions as will be understood readily. For operating the sprocket 41 a chain 42 is trained over another sprocket 43 which is mounted on a shaft 44 that forms a part of an operator, shown generally at 45, and mounted on the front wall 16. The operator 45 includes a manually operable handle 46 which is mounted on and rotates with the shaft 44 and sprocket 43 to transmit the operating force through the chain 42 to the sprocket 41 for operating the disconnecting switches 39. It will be understood that the sprocket 41, chain 42 and sprocket 43 are located inside an operator housing 48 mounted on the door stile 19 or inside of the enclosure 10 and that the handle 46 is located exteriorly of the housing 48 and enclosure 10. A locking pin 47 is located on the housing for the operator 45 and is arranged to interfit with the shaft 44 to prevent rotation thereof unless the locking pin 47 is withdrawn. As will be pointed out hereinafter, additional means are provided for preventing rotation of the shaft 44 and movement of the handle 46 under certain conditions.

Attention has been called to the fact that the enclosure 10 is subjected to substantial stress on operation of the fuse or fuses 38, depending upon the number employed and the number subjected to fault circuit conditions. When the fuse or fuses operate, a shock wave is generated which tends to cause the walls 11 to 16 and the door 20 to bulge outwardly. The extent that this bulging action takes place depends upon the severity of the fault required to be interrupted by the fuse or fuses 38. In accordance with this invention provision is made for latching the door 20 in the closed position in such manner as to accommodate the blast action incident to the opertaion of the fuse or fuses 38. The construction is such that a limited amount of bulging action can be accommodated without causing disengagement of the latching mechanism which holds the door 20 against opening movement.

With the foregoing requirements in mind, provision is made for latching the door 20 closed at three places along the side opposite the side where the hinges, above described, are located. The three latch mechanisms are essentially duplicates of each other insofar as their latching functions are concerned and it will be understood that a description of one applies to all of them. Each latch includes a fixed latch member 50 and a movable latch member 51, the former being rigidly mounted on the stile 19 and the latter being loosely rotatably and resiliently mounted on the door 20.

As shown more clearly in FIGURES 6, 8, 9 and 10 of the drawings, the fixed latch member 50 includes a shank 52 which overlies the stile 19 and is rigidly affixed thereto by any suitable means, such as welding. The fixed latch member 50 has an offset portion 53 which is provided with an arcuate groove 54 that faces inwardly of the enclosure 10. Along one side of the arcuate groove 54 there is an arcuate latching surface 55. At the bottom of the arcuate groove 54 there is an inclined camming surface 56 the purpose of which will be apparent presently. This description of the fixed latch member 50 is applicable to the other two fixed latch members that are used. The uppermost latch member 50 is provided additionally with an integrally formed stop boss 57 and a threaded aperture 58 which are employed in conjunction with an interlocking mechanism to be described.

The movable latch member 51 is shown in FIGURES 6 and 11 to 15 of the drawings. It includes an arcuate hook portion 60 that is arranged to interfit with the arcuate groove 54 and it has an inclined camming surface 61 which is arranged to engage the inclined camming surface 56 at the bottom of the groove 54 of the fixed latch member 50 for the purpose of camming the door 20 closed against the resilient gasket 22 when the door is locked closed. The arcuate hook portion 60 also has an arcuate latching surface 62 that is arranged to overlie and engage the arcuate latching surface 55 on the fixed latch member 50. The relationship between the latching surfaces 55 and 62 will be pointed out in more detail hereinafter.

The movable latch member 51 also is provided with an integral central boss 63 that has a clearance aperture 64 extending therethrough with a countersunk opening 65 at one end. Formed integrally with the movable latch member 51 is an arm 66 which is apertured at 67 for receiving a pin 68 which serves to connect the arm 66 to a door latching link 69 that, as shown in FIGURE 5, is common to the three latch mechanisms and serves to effect their conjoint operation. The arrangement and location of the door latching link 69 with the arms 66 are such as to bias the movable latch members 51 into latching position under the influence of gravity.

The manner in which the movable latch members 51 at the upper and lower ends of the door latching link 69 are mounted is identical and is shown in FIGURE 6. Here it will be observed that a latch pivot 70 is welded at right angles to the inner face of the door 20 and is provided with an annular centering portion 71 for interfitting with the countersunk opening 65 in the latch 51. The annular centering portion 71 loosely interfits in the counterbore 65 to center the movable latch member 51 on a threaded stud 72 and yet permits considerable resilient flexibility in the position of the movavble latch member 51 with respect to the door 20. The threaded stud 72 extends through the clearance aperture 64 in the movable latch member 51 and a substantial clearance, as indicated at 73, is provided therebetween which also permits flexibility in movement of the movable latch member 51 with respect to the door 20.

In order to hold the movable latch member 51 in position on the threaded stud 72 and yet permit considerable flexibility in its movement, a nut 74 is threaded on the outer end of the stud 72. It reacts against the movable latch member 51 through a resilient washer 75 which may be formed of rubber or synthetic rubber. Flat steel washers 76 are provided on opposite sides of the resilient washer 75. The nut 74 is tightened sufficiently to cause the resilient washer 75 to be compressed to such an extent as to cause positive camming engagement between the fixed and movable latch members 50 and 51 and adequate compression for the gasket 22 while at the same time permitting some lateral motion of the movable latch member 51 when the blast action incident to operation of the vented fuse or fuses 38 occurs.

When the blast action takes place, the door 20 bulges outwardly to a position which may be represented by the broken line 77 and through an angle as indicated at 78. It will be understood that the showing of this bulging action is arbitrary in FIGURE 6 and that it will vary, depending upon the severity of the blast action. When the door 20 bulges or shifts as indicated, the threaded stud 72 is shifted from the position indicated by the solid line 79 through its longitudinal axis to a position indicated by broken line 80 and through an angle indicated at 81. Because of the loose mounting of the movable latch member 51 on the threaded stud 72 in the manner described, the angular displacement of the threaded stud 72, as indicated at 81, is permitted while still maintaining latching engagement between the fixed and movable latch members 50 and 51, or more specifically, maintaining latching contact engagement between the inclined camming surfaces 56 and 61 generally in a plane parallel to the plane of the door 20. This prevents the door from being blown open and the surfaces 56 and 61 are held in overlapping engagement through the interaction between the arcuate latching surfaces 55 and 62 located generally at right angles to the plane of the door 20. In addition, because of the flexibility provided by the resilient washer 75, lateral shock absorbing displacement, as indicated at 82, of the door 20 and latch pivot 70 can take place relative to the movable latch member 51 and still the latching engagement, substantially as described, is maintained.

The shape and relationship between the arcuate latching surfaces 55 and 62 on the fixed and movable latch members 50 and 51 are arranged in such manner as to resist displacement and deformation resulting from the stresses incident to the bulging of the closure 10. These forces, which tend to pry apart the side walls 13 and 14 together with the vertical stiles 19 and to push the door 20 open, are recurrent and variable and tend to disengage the movable latch member 51 from the fixed latch member 50. Accordingly, the arcuate latching surfaces 55 and 62 are arranged generally at right angles to the door 20 so as to allow limited angular displacement of the door 20 relative to the stile 19 and yet maintain the necessary latching engagement to resist shock loading on the door 20 and to permit some lateral displacement due to pressure on the side walls 13 and 14 in order to hold the door closed when it is subjected to the blast action from the vented fuse or fuses 38.

As pointed out above, the arcuate hook portion 60 of the movable latch member 51 interfits with the groove 54 in the fixed latch member 50 so that these respective portions of these latch members overlie each other. Additionally the arcuate latching surfaces 55 and 62 are shaped so as to have mating engagement along a common arcuate surface having a truncated conical section a portion of which is indicated by a solid line 85 in FIGURE 7 of the drawings. As indicated here the line 85 is located at an angle, indicated at 86, which is equal to or less than 90° away from a broken line 87 which indicates the direction along which the minimum resultant force $R_f$ occurs or is parallel to a line along which such minimum resultant force occurs that is caused by the minimum blast action that may be expected. This arrangement of the arcuate latching surfaces 55 and 62 along the common surface plane represented by the line 85 resists a tendency for the movable latch member 51 to cam out of engagement with the fixed latch member 50 during a blast and yet it allows outward angular displacement of the movable latch member 51 without affecting the resistance to separation as long as such displacement does not exceed the angle indicated at 88 between the line 87 indicating the minimum resultant force and a broken line 89 indicating the direction along which the maximum resultant force $R_f$ may occur.

An intermediate resultant force $R_f$ is indicated by the full line 90 which is positioned intermediate the lines 87 and 89.

The mounting of the movable latch member 51 intermediate the end latch mechanisms is shown in FIGURE 7. Here it will be observed that movable latch member 51 is loosely mounted on a shaft 92 which is journaled in a bearing sleeve 93 that extends through the door 20. A radially extending pin 94 projects at the ends from opposite sides of the shaft 92 into radial slots 95 which extend outwardly from the clearance aperture 64 in the movable latch member 51. In this manner the movable latch member 51 is caused to rotate with the shaft 92. This rotating force is transmitted through the door latching link 69 to the upper and lower movable latch members 51 as will be understood readily. Interfitting loosely with the counterbore 65 is an annular centering portion 96 of a nut 97 which is threaded on the inner end of the bearing sleeve 93 and serves to hold it in position on the door 20. The opposite end of the shaft 92 is knurled at 98 for receiving thereon a hub 99 from which a handle 100, FIGURE 1, extends to permit manual rotation of the shaft 92 and conjoint rotation of the movable latch members 51 by the door latching link 69 into or out of the latching position.

As pointed out hereinbefore, it is desirable that means be provided for mechanically interlocking the operation of the disconnecting switch or switches 39 with the latch mechanism for the door 20 to the end that the door 20 cannot be opened when the disconnecting switch or switches 39 are closed and the switch or switches 39 cannot be closed when the latch mechanism is in the unlatched position where the door 20 can be opened. To accomplish this interlocking relationship the construction shown in FIGURES 16 to 19 is provided.

It will be observed that a rotatable member, shown generally at 103, is mounted for rotation with the shaft 44 to which the handle 46 is attached. The rotatable member 103 is provided with radially extending recesses 104 at diametrically opposite positions for receiving the locking pin 47. It is necessary that this locking pin 47 be withdrawn from the respective recess 104 before the rotatable member 103 can be rotated. In addition the rotatable member 103 is provided with a stop portion or shoulder 105 and a semi-circular cam portion 106. The stop portion or shoulder 105 and the semi-circular cam portion 106 are arranged to be engaged by a curved end 107 of a locking lever 108 that is pivoted at 109 on the housing 48 for the operator 45. At its other end the locking lever 108 carries a transversely extending pin 110 having a head 111, FIGURE 19, to which one end 112 of a link in the form of a flexible wire 113 is securely clamped. The wire 113 forms a part of a control cable, shown generally at 114, and extends through a stationary sleeve 115 that is mounted on the enclosure 10 with the arrangement being such that tension and compression forces can be transmitted by the wire 113 through the sleeve 115. The other end 116 of the link or wire 113 is securely clamped to a head 117 on a pin 118, FIGURE 6, which extends transversely through an arm 119 of a pawl 120. The pawl 120 is pivotally mounted by a threaded stud 121 that extends into the threaded aperture 58 on the fixed latch member 50 as shown in FIGURES 8 to 10 and described hereinbefore.

The other end of the pawl 120 is bifurcated and has a pair of arms 122 and 123 with a notch 124 therebetween. The notch 124 is provided to receive a detent 125 that is formed integrally with the movable latch member 51 as shown in FIGURES 11 to 15 of the drawings. In this respect the movable latch member 51 at the upper end of the door 20 differs from the other movable latch members. The arms 122 and 123 are provided with faces 126 and 127, respectively, that are arranged to cooperate with faces 128 and 129, respectively, on the detent 125. A coil tension spring 130 is connected at one end to the arm 119 of the pawl 120 and at the other end to an anchor pin 131 which is mounted on the front wall 16 of the enclosure 10. The spring 130 serves to bias both the pawl 120 and the locking lever 109 in clockwise directions as viewed in FIGURES 16 to 18 of the drawings.

FIGURE 16 of the drawings shows the relationship between the upper fixed and movable latch members 50 and 51 in the unlatched position. It will be understood that the other movable latch members 51 occupy similar positions with respect to their fixed latch members 50. Likewise, FIGURE 16 shows the position of the rotatable member 103 when the disconnecting switch or switches 39 are in the open position and the handle 46 is in its lowermost position or 180° away from the position shown in FIGURE 2. Here it will be observed that the spring 130, acting through the pawl 120 and the link or wire 113, holds the locking lever 108 in locking position with the curved end 107 in locking engagement with the stop portion or shoulder 105 and the pawl 120 against the stop boss 57. As a result, the rotatable member 103 is held against rotation and force applied thereto in the direction indicated by the arrow 132 in FIGURE 16 to close the switch or switches 39 is ineffective as long as the movable latch members 51 remain in the unlatched position.

Now, when the handle 100 on the front of the door 20 is rotated to move the movable latch members 51 into the latching position shown in FIGURE 17, the face 128' on the detent 125 engages the face 126 on the arm 122 and rocks the pawl 120 in a counterclockwise direction to move the curved end 107 out of engagement with the stop portion or shoulder 105. Now it is possible, after the pin 47 is withdrawn, to rotate the rotatable member 103 and therewith the sprocket 43 to operate the disconnecting switch or switches 39 through the chain 42 and sprocket 41.

FIGURE 18 shows the position of the rotatable member 103 when the switch or switches 39 are closed. It will be observed with reference to FIGURES 16 and 17 that, as the switch or switches 39 are being closed, the semi-circular cam portion 106 engages the curved end 107 and the underside of the locking lever 108 and moves it further in a counterclockwise direction from the position shown in FIGURE 17. This applies a tension force to the link or wire 113, rocks the pawl 120 to the position shown in FIGURE 18 and further tensions the spring 130. Here the face 127 overlies the face 129 on the detent 125 and prevents rotation of the upper movable latch member 51 and thereby through the door latching link 69 prevents rotation of the other movable latch members 51 to the unlatching position. As long as the movable latch members 51 remain in the latched position shown in FIGURE 18, a force indicated by the arrow 133 applied to the rotatable member 103 and associated parts will be effective to open the disconnecting switch or switches 39. Thus, as long as the movable latch members 51 remain in the latching position shown in FIGURE 18, the disconnecting switch or switches 39 can be operated between the closed and open positions as may be desired. However, the movable latch members 51 can be moved to the unlatched position as shown in FIGURE 17 only when the switch or switches 39 are opened. Further, when the switch or switches 39 are open, as shown in FIGURE 16, they cannot be closed unless the door 20 is closed and the movable latch members 51 are in the latched position, as shown in FIGURE 17.

When the movable latch members 51 are in the latched position, as shown in FIGURE 17, with the door 20 closed, the spring 130 moves the pawl 120 to a position such that the face 126 on the arm 122 engages the face 128 on the detent 124 in a plane generally at right angles to the pivot axis of the movable latch member 51. This prevents the spring 130 from unlatching the door 20 by moving the latch members 51 to the unlatched position. At the same time, as described, the link or wire 113 keeps the locking lever 108 in the position shown in FIGURE 17 where the rotatable member 103 and parts associated therewith can be rotated to effect closure of the switch or switches 39.

When the switch or switches 39 are closed and the parts occupy the position shown in FIGURE 18, the locking lever 108 is moved beyond the position shown in FIGURE 17. This keeps the pawl 120 in the position shown in FIGURE 18 where the face 127 on the arm 123 engages the face 129 on the detent 125 in a plane generally at right angles to the pivot axis of the pawl 120. This makes it possible to rotate the latch members 51 to the unlatched position and subsequent opening of the door 20 as long as the switch or switches 39 remain closed.

When the rotatable member 103 is rotated to the position shown in FIGURE 17, corresponding to the open position of the switch or switches 39, the spring 130 acting through the pawl 120 and the link or wire 113 rocks the locking lever 103 to the position here shown and shifts the pawl 120 to the position previously described with respect to the arm 122 and the detent 125.

Since certain further changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. In combination, a housing having walls and a door in one wall, hinge means on one side of said door swingably mounting it on said housing, latch means on the opposite side of said door having disengageable latching surfaces releasably holding it closed, a high voltage electric circuit in said housing including a disconnecting switch connected in series with a vented fuse, said walls and door being likely to bulge outwardly as a result of forces generated by blast action on blowing of said vented fuse; said latch means including one latch member rigidly affixed to said housing and another latch member rotatably mounted on said door, said latch members overlapping each other with said latching surfaces engaging in a common arcuate surface having a truncated conical section located at an angle equal to or slightly less than 90° away from a line parallel to the line along which the force resulting from the minimum blast action likely to be encountered reacts; operating means mounted on said housing and connected to said disconnecting switch for opening and closing it, said operating means including a rotatable member inside said housing having a stop portion and a cam portion and a handle outside said housing for rotating said rotatable member, a locking lever pivoted on said housing for selectively engaging said stop portion or said cam portion, a pawl pivotally mounted on said housing in cooperative relation to said other latch member, a link interconnecting said locking lever and said pawl, spring means biasing said locking lever and said pawl respectively into engagement with said stop or cam portions on said rotatable member and with said other latch member, and a detent on said other latch member cooperating with said pawl when said disconnecting switch is closed and said locking lever engages said cam portion to prevent unlatching of said latch members and opening of said door, said spring means biasing said locking lever into locking engagement with said stop portion on said rotatable member when said disconnecting switch is open and said latch members are unlatched to prevent closure of said disconnecting switch by said operating means, said detent acting through said pawl and link when said door is closed and said latch members are latched to hold said locking lever out of engagement with said stop portion on said rotatable member whereby said disconnecting switch can be operated by said operating means.

2. In combination, a housing having walls and a door in one wall, hinge means on one side of said door swingably mounting it on said housing, latch means on the opposite side of said door having disengageable latching surfaces releasably holding it closed, a high voltage electric circuit in said housing including a disconnecting switch connected in series with a vented fuse, said walls and door being likely to bulge outwardly as a result of forces generated by blast action on blowing of said vented fuse; said latch means including one latch member rigidly affixed to said housing and another latch member rotatably mounted on said door, said latch members overlapping each other with said latching surfaces engaging in a common arcuate surface having a truncated conical section located at an angle equal to or slightly less than 90° away from a line parallel to the line along which the force resulting from the minimum blast action likely to be encountered reacts, the relation between said latching surfaces being such that they remain in latching engagement as long as said line along which said force reacts does not shift beyond a predetermined angle from said line along which said force resulting from said minimum blast action reacts; operating means mounted on said housing and connected to said disconnecting switch for opening and closing it, said operating means including a rotatable member inside said housing having a stop portion and a cam portion and a handle outside said housing for rotating said rotatable member, a locking lever pivoted on said housing for selectively engaging said stop portion or said cam portion, a pawl pivotally mounted on said housing in cooperative relation to said other latch member, a link interconnecting said locking lever and said pawl, spring means biasing said locking lever and said pawl respectively into engagement with said stop or cam portions on said rotatable member and with said other latch member, and a detent on said other latch member cooperating with said pawl when said disconnecting switch is closed and said locking lever engages said cam portion to prevent unlatching of said latch members and opening of said door, said spring means biasing said locking lever into locking engagement with said stop portion on said rotatable member when said disconnecting switch is open and said latch members are unlatched to prevent closure of said disconnecting switch by said operating means, said detent acting through said pawl and link when said door is closed and said latch members are latched to hold said locking lever out of engagement with said stop portion on said rotatable member whereby said disconnecting switch can be operated by said operating means.

3. In combination, a housing having walls and a door in one wall, a compressible gasket between said door and said one wall, hinge means on one side of said door swingably mounting it on said housing, latch means on the opposite side of said door having disengageable latching surfaces releasably holding it closed, a high voltage electric circuit in said housing including a disconnecting switch connected in series with a vented fuse, said walls and door being likely to bulge outwardly as a result of forces generated by blast action on blowing of said vented fuse; said latch means including one latch member rigidly affixed to said housing and another latch member rotatably mounted on said door, said latch members overlapping each other with said latching surfaces engaging in a common arcuate surface having a truncated conical section located at an angle equal to or slightly less than 90° away from a line parallel to the line along which the force resulting from the minimum blast action likely to be encountered reacts, said latch members having cooperating camming surfaces whereby when said other latch member is rotated to latching position said door is moved about its hinge axis toward said housing and said gasket is compressed; operating means mounted on said housing and connected to said disconnecting switch for opening and closing it, said operating means including a rotatable member inside said housing having a stop portion and a cam portion and a handle outside said housing for rotating said rotatable member, a locking lever pivoted on said housing for selectively engaging said stop portion or said came portion, a pawl pivotally mounted on said housing in cooperative relation to said other latch member, a link interconnecting said locking lever and said pawl, spring means biasing said locking lever and said pawl respectively into engagement with said stop or cam portion on said rotatable member and with said other latch member, and a detent on said other latch member cooperating with said pawl when said disconnecting switch is closed and said locking lever engages said cam portion to prevent unlatching of said latch members and opening of said door, said spring means biasing said locking lever into locking engagement with said stop portion on said rotatable member when said disconnecting switch is open and said latch members are unlatched to prevent closure of said disconnecting switch by said operating means, said detent acting through said pawl and link when said door is closed and said latch members are latched to hold said locking lever out of engagement with said stop portion on said rotatable member whereby said disconnecting switch can be operated by said operating means.

4. In combination, a housing having walls and a door in one wall, hinge means on one side of said door swingably mounting it on said housing, latch means on the opposite side of said door having disengageable latching surfaces releasably holding it closed, a high voltage electric circuit in said housing including a disconnecting switch connected in series with a vented fuse, said walls and door being likely to bulge outwardly as a result of forces generated by said blast action on blowing of said vented fuse; said latch means including one latch member rigidly affixed to said housing and another latch member rotatably mounted on said door, said latch members overlapping each other with said latching surfaces engaging in a common arcuate surface having a truncated conical section located at an angle equal to or slightly less than 90° away from a line parallel to the line along which the force resulting from the minimum blast action likely to be encountered reacts, and pivot means on said door providing the rotatable mounting for said other latch member about a pivot axis and characterized by permitting said other latch member to be displaced along said axis away from said door and displaced angularly away from said axis; operating means mounted on said housing and connected to said disconnecting switch for opening and closing it, said operating means including a rotatable member inside said housing having a stop portion and a cam portion and a handle outside said housing for rotating said rotatable member, a locking lever pivoted on said housing for selectively engaging said stop portion or said cam portion, a pawl pivotally mounted on said housing in cooperative relation to said other latch member, a link interconnecting said locking lever and said pawl, spring means biasing said locking lever and said pawl respectively into engagement with said stop or cam portions on said rotatable member and with said other latch member, and a detent on said other latch member, and a detent on said other latch member cooperating with said pawl when said disconnecting switch is closed and said locking lever engages said cam portion to prevent unlatching of said latch members and opening of said door, said spring means biasing said locking lever into locking engagement with said stop portion on said rotatable member when said disconnecting switch is open and said latch members are unlatched to prevent closure of said disconnecting switch by said operating means, said detent acting through said pawl and link when said door is closed and said latch members are latched to hold said locking lever out of engagement with said stop portion on said rotatable member whereby said disconnecting switch can be operated by said operating means.

5. The invention, as set forth in claim 4, wherein yieldable means bias the other latch member toward the door along the pivot axis.

6. In combination, a housing having walls and a door in one wall, hinge means on one side of said door swingably mounting it on said housing, latch means on the opposite side of said door releasably holding it closed, a disconnecting switch in said housing, operating means mounted on said housing and connected to said disconnecting switch for opening and closing it, said operating means including a rotatable member inside said housing having a stop portion and a cam portion and a handle outside said housing for rotating said rotatable member, a locking lever pivoted on said housing for selectively engaging said stop portion or said cam portion, a pawl pivotally mounted on said housing in cooperative relation to said latch means, a link interconnecting said locking lever and said pawl, spring means biasing said locking lever and said pawl respectively into engagement with said stop or cam portions on said rotatable member and with said latch means, and detent means on said latch means cooperating with said pawl when said disconnecting switch is closed and said locking lever engages said cam portion to prevent unlatching of said latch means and opening of said door, said spring means biasing said locking lever into locking engagement with said stop portion on said rotatable member when said disconnecting switch is open and said latch means is unlatched to prevent closure of said disconnecting switch by said operating means, said detent means acting through said pawl and link when said door is closed and said latch means is latched to hold said locking lever out of engagement with said stop portion on said rotatable member whereby said disconnecting switch can be operated by said operating means.

7. The invention, as set forth in claim 6, wherein the link interconnecting the locking lever and pawl is a flexible member capable of transmitting tension and compression forces, and the spring reacts against said pawl.

8. The invention, as set forth in claim 6, wherein the detent means and pawl are in one locked relation when the door is latched closed and the disconnecting switch is closed to prevent opening of said door and in another locked relation when said door is latched closed and said disconnecting switch is open to prevent the spring from unlatching the door.

9. In combination, a housing having walls and door in one wall, a high voltage electric circuit in said housing including a vented fuse, hinge means on one side of said door swingably mounting it on said housing, and latch means inside said housing on the opposite side of said door having disengageable latching surfaces and releasably holding it closed, said walls and door being likely to bulge outwardly as a result of forces generated by blast action on blowing of said vented fuse; said latch means including one latch member affixed to the inside of said housing and extending toward said door and another latch member rotatably mounted on the inside of said door, said latch members having one pair of arcuate overlapping surfaces within said housing and generally parallel to the plane of said door to prevent opening thereof and another pair of overlapping arcuate surfaces within said housing and at an angle approaching but not exceeding 90° away from the plane of said door to prevent endwise separation of said latch members while permitting angular displacement of said other latch member relative to said one latch member when said wall and door bulge as aforesaid, pivot means on the inner side of said door providing the rotatable mounting for said other latch member about a pivot axis and characterized by permitting said other latch member to be displaced along said axis inwardly of said door and also displaced angularly away from said axis, yieldable means biasing said other latch member toward said door along said axis, and operating means operable exteriorly of said housing and extending through said door and connected to said other latch member for rotating it about said axis relative to said one latch member.

10. The invention, as set forth in claim 9, wherein the pivot means is a bolt secured at one end to the inner side of the door, said bolt extends through a clearance opening in the other latch member and is threaded at its other end a nut is threaded on said other end of said bolt, and a resilient washer is interposed in stressed condition between said nut and said other latch member to bias it toward said door.

11. In combination, a housing having walls with an opening in one wall having stiles on opposite sides, a door for closing said opening hinged along one side to one stile and latched along the opposite side to the other stile, a high voltage electric circuit in said housing including a device likely to generate substantial pressure by blast action within said housing and cause said walls and door to bulge outwardly, and means within said housing for latching said door closed including one latch member affixed to the inside of said other stile and extending toward said one stile and another latch member pivotally mounted on the inside of said door to swing in a plane generally parallel to the plane of said door, said latch members having overlapping arcuate engagement in a plane generally parallel with the plane of said door to resist forces tending to swing said door open, said latch members also having arcuate faces to engage in another plane angularly offset from said plane of said door sufficiently to resist components of forces tending to displace said latch members generally in a lateral direction paralell with said plane of said door as it bulges under blast pressure and said stiles tend to be displaced further apart as a result of blast pressure on said walls.

12. In combination, a housing having walls with an opening in one wall having stiles on opposite sides, a door for closing said opening hinged along one side to one stile and latched along the opposite side to the other stile, a high voltage electric circuit in said housing including a device likely to generate substantial pressure by blast action within said housing and cause said walls and door to bulge outwardly, means for latching said door closed including one latch member inside said housing affixed to said other stile and another latch member pivotally mounted on the inside of said door to rotate in a plane generally parallel to the plane of said door for engaging said one latch member, said latch members having one pair of overlapping latching surfaces to resist outward movement of said door and another pair of overlapping latching surfaces to resist lateral forces resulting from blast pressure on said walls tending to move said stiles apart and disengage said latch members, and means operable exteriorly of said housing and operatively connected to said other latch member for rotating it into or out of latching engagement with said one latch member.

References Cited in the file of this patent

UNITED STATES PATENTS

| | | |
|---|---|---|
| 1,094,773 | Beehler | Apr. 28, 1914 |
| 1,122,026 | O'Rourke | Dec. 22, 1914 |
| 1,192,397 | Downes et al. | July 25, 1916 |
| 1,361,684 | Coffin | Dec. 7, 1920 |
| 1,399,488 | Krantz | Dec. 6, 1921 |
| 1,486,960 | Hart | Mar. 18, 1924 |
| 2,020,913 | Schramm | Nov. 12, 1935 |
| 2,060,903 | Santore | Nov. 17, 1936 |
| 2,595,102 | Santangelo | Apr. 29, 1952 |
| 2,759,054 | Goudy et al. | Aug. 14, 1956 |
| 2,851,548 | Edmunds | Sept. 9, 1958 |
| 2,946,865 | Thomas | July 26, 1960 |
| 2,989,603 | Mikos et al. | June 20, 1961 |